C. DE QUILLFELDT.
Improvement in Dog-Muzzles.
No. 130,846.  Patented Aug. 27, 1872.
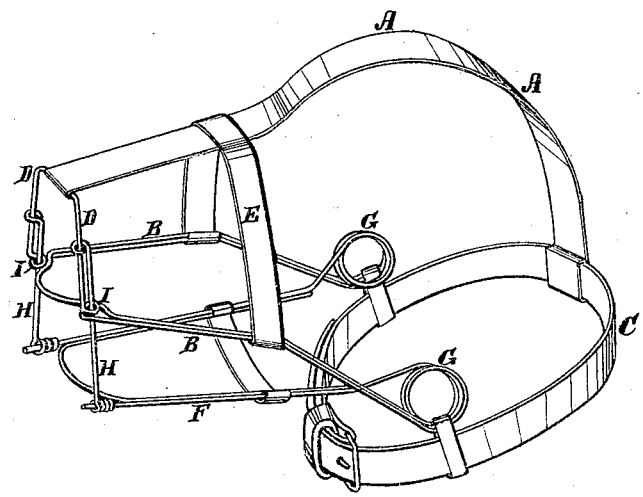
Witnesses:
A. Benneckendorf.
C. Sedgwick.
Inventor:
C. de Quillfeldt
PER Munn & Co
Attorneys.

UNITED STATES PATENT OFFICE.

CHARLES DE QUILLFELDT, OF NEW YORK, N. Y.

IMPROVEMENT IN DOG-MUZZLES.

Specification forming part of Letters Patent No. 130,846, dated August 27, 1872.

Specification describing a new and Improved Muzzle for Dogs, invented by CHARLES DE QUILLFELDT, of the city, county, and State of New York.

My invention consists in having the portion of the frame of the muzzle under the lower jaw to spring downward and allow the dog to open his mouth as widely and nearly as freely as when unmuzzled, the spring returning the said part of the frame again as the mouth closes.

The drawing is a perspective view of a dog-muzzle constructed according to my invention.

The permanent frame fitting over the head, nose, and upper jaw, consists of the head and nose-strap A and wires B, connected together at one end by the collar C for the neck, also connected at the end of the nose by the wires D, and across the upper portion of the nose by the strap E. The wires B range along the sides near about the line of the mouth, and connect to the collar C near the joint of the lower jaw, and at this point the part F, which fits under the lower jaw, is connected by coiled or any equivalent springs G, while the front end is connected to the front nose-rods D by rods H passing up through guides I, and so connected to said rods D as to rise and fall on them freely. These rods H prevent the part F from being bent down too far or otherwise displaced by the efforts of the dog to free himself from the muzzle.

It is not essential that the connection of the part F to the upper portion of the frame be precisely like the arrangement shown, nor is it necessary to have the springs exactly like the springs shown; but any suitable contrivances by which the essential object sought—that is, the opening and closing of the muzzle with the opening and closing of the mouth—can be attained, will come within the spirit of my invention. The improved muzzle is applicable to other animals also.

Having thus described my invention, I claim as new and desire to secure by Letters Patent—

A muzzle for dogs and other animals, in which the portion of the frame confining the lower jaw is made to open and close relatively to the other portion of the frame, with the opening and closing of the animal's mouth, substantially in the manner described.

C. DE QUILLFELDT.

Witnesses:
   A. P. THAYER,
   T. B. MOSHER.